May 8, 1951     R. A. GORDON     2,551,594
RADIO DIRECTION FINDER
Filed March 2, 1939     2 Sheets-Sheet 1
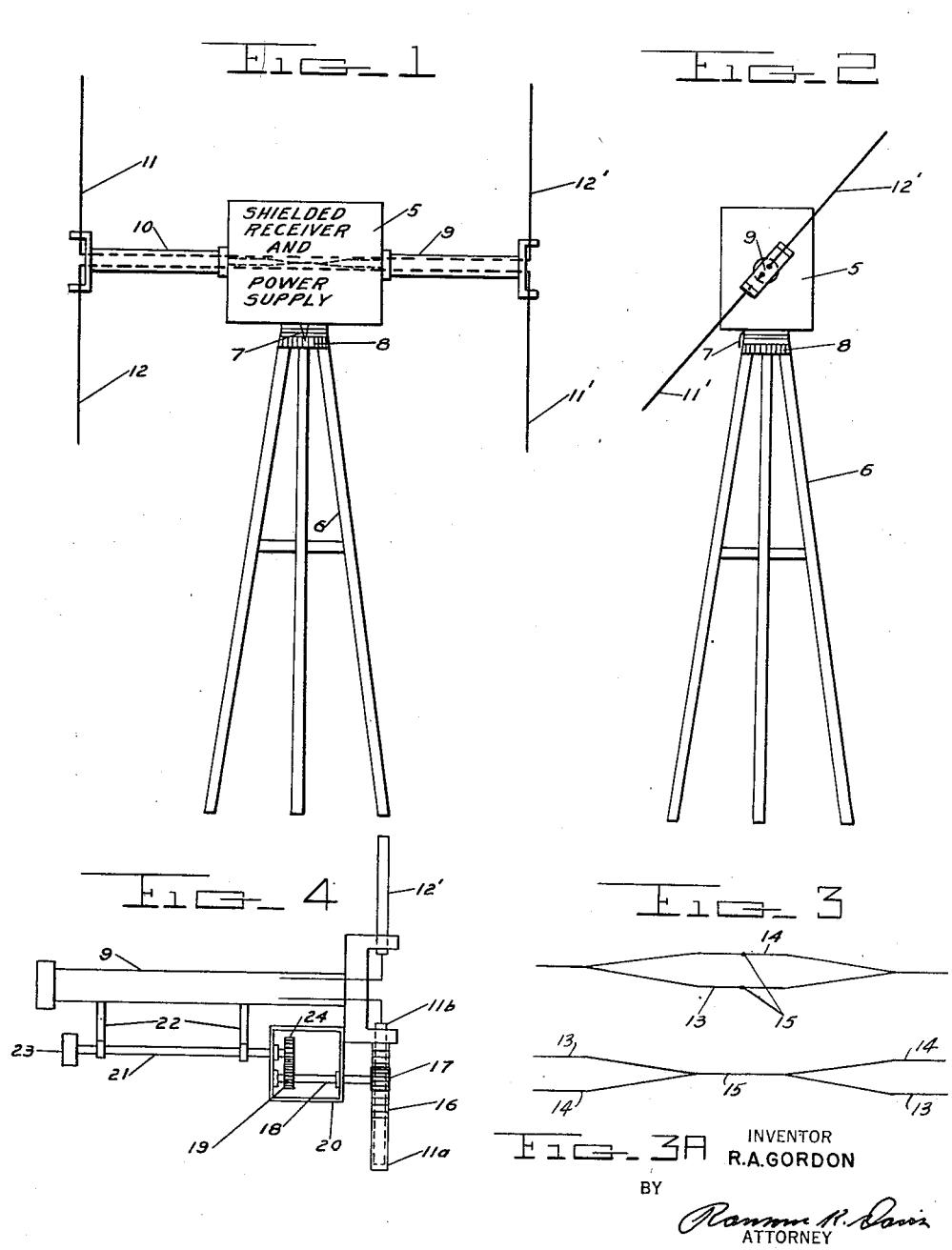

May 8, 1951  R. A. GORDON  2,551,594
RADIO DIRECTION FINDER
Filed March 2, 1939  2 Sheets-Sheet 2
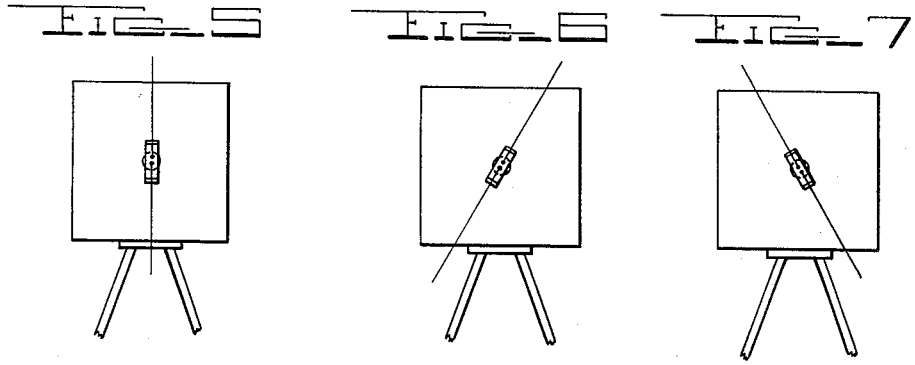
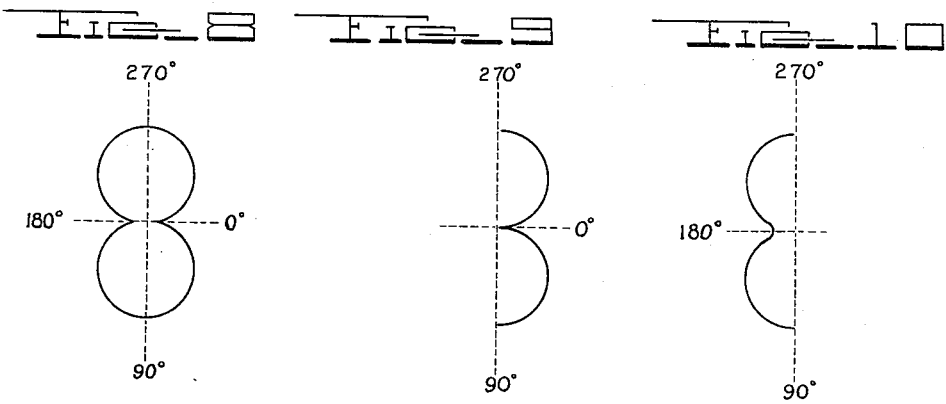
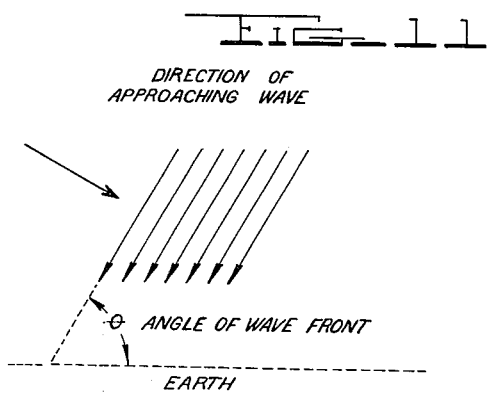
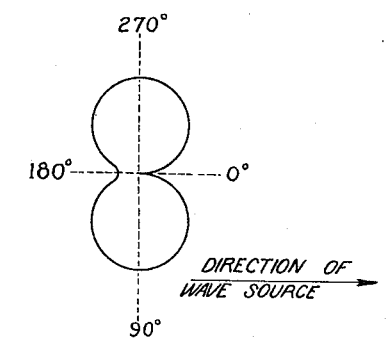
Inventor
Raymond A Gordon
By
Attorney Patented May 8, 1951

2,551,594

UNITED STATES PATENT OFFICE 2,551,594

RADIO DIRECTION FINDER

Raymond A. Gordon, Hyattsville, Md.

Application March 2, 1939, Serial No. 259,381

12 Claims. (Cl. 343—113)

(Granted under the act of March 3, 1883, as amended April 30, 1928; 370 O. G. 757)

This invention relates to means for determining the direction from which a received radio signal is coming and more particularly to such means employing collectors of a modified Adcock type and contemplates the use of high frequency radio waves for direction finding purposes.

Among the several objects of this invention are:

To provide means for determining with a high degree of accuracy the direction from which radio signals are being received;

To provide radio direction finding means that will eliminate errors due to changes in the energy vectors of a radio signal resulting from shifts in polarization;

To provide means for ascertaining directly and positively the azimuth and elevational angles of the path of a radio signal;

To provide a device whereby the distance of an aircraft from the receiving station may be determined upon receiving information as to his altitude from the pilot of such craft.

The manner in which the foregoing and other objects, that will become apparent to those skilled in this art, are achieved is set forth in the following description which should be read in connection with the accompanying drawings wherein:

Fig. 1 is a side elevational view of a successfully operative embodiment of my invention;

Fig. 2 is an end elevation of the apparatus shown in Fig. 1;

Fig. 3 is a detail view showing the relation of the connections from the collectors to the receiver as they appear when viewed from above in Fig. 1;

Fig. 3A shows the collector connections of Figs. 1 and 3 as they appear when viewed from the side in Fig. 1.

Fig. 4 is a detail view of means that may be used for obtaining absolute electrical balance between the collectors;

Figs. 5, 6 and 7 are side elevational views of a direction finder embodying the invention, illustrating the orientation of the collectors during the various steps of the method of operation forming a part of my invention;

Figs. 8, 9 and 10 are polar response patterns of the direction finder shown in Figs. 5, 6 and 7, each response curve relating to the figure directly above it;

Fig. 11 is a graphical representation of the make-up of an electro-magnetic wave moving in a manner to produce the response curves of Figs. 8, 9 and 10 in a direction finder oriented as shown in Figs. 5, 6 and 7 respectively, and Fig. 12 is a composite of the response curves shown in Figs. 9 and 10.

The present invention embodies some of the features shown in my Patent No. 2,093,432, patented September 21, 1937, wherein I have shown and described radio receiving means, together with the necessary power supply, wholly enclosed within the collector system.

It is well known that difficulty in obtaining accurate bearings with radio direction finders is experienced due to the fact that the signal wave is frequently not vertically polarized and consequently it is impossible to determine to a high degree of accuracy when a signal minimum is obtained. My present invention eliminates the uncertainty due to this factor.

The particular type of receiver and power supply is immaterial so long as it is adapted to the reception of the frequencies to be worked and I have therefore not shown any details thereof but have illustrated a housing 5 within which the receiver and power supply are both enclosed. Housing 5 is supported at any suitable distance above the ground on any desired kind of base, which is here illustrated as a tripod 6. The housing 5 is mounted on tripod 6 to be rotatable in azimuth and has fixed to it an index 7 moving over a scale 8 graduated in degrees of arc whereby the azimuth angle may be determined.

Extending horizontally from opposite sides of the housing 5 are hollow arms 9 and 10, mounted coaxially with each other to be simultaneously and equally rotatable about their common horizontal axis. One collector of the Adcock system has a member 11 extending upwardly from the extremity of arm 10 and a member 11' extending downwardly from the extremity of arm 9 and the second collector of the system has a member 12 extending downwardly from arm 10 and a member 12' extending upwardly from arm 9, all of said members being coplanar and the members carried at the end of each arm lying substantially in a common straight line.

In the usual Adcock system the portions of the collectors extending from one lateral member to the other are crossed at their midpoint and are there connected together and coupled to the receiver. However, this gives rise to certain undesirable electrical characteristics due to the difficulty of making symmetrical connections to the antenna. Any unsymmetrical arrangement of the components used with the antenna may cause errors in the position of the null obtained by the Adcock antenna system. To eliminate these defects I have imparted to the connecting portion between the members 11 and 11', 12 and 12', a 90° twist so that the plane of the connecting portions 13 and 14 becomes at right angles to the common plane of the collectors 11, 11', etc., as shown in Fig. 3 wherein the connecting portions are viewed in a direction parallel to the length of the members 11, 11' and the receiver is connected to the portions 13 and 14 at the points 15 where the portions 13 and 14 are disposed parallel to each other.

Fig. 3A shows, from a different viewpoint, the appearance of the part of the connecting portions 13 and 14 of the collectors which was illustrated in Fig. 3. In this view the connecting portions are seen from the front or back of the direction finder as in Fig. 1. At the left of the figure the lead 13 is above lead 14. At the center of the figure the two leads lie in the same horizontal plane and at the right lead 14 lies above lead 13. The central arrangement wherein the leads lie in a horizontal plane and extend in mutual parallelism greatly facilitates a symmetrical connection to the receiver.

It is known that the downwardly extending member, as 11', should be longer than the upwardly extending member 11 of the same collector due to the greater capacitance to ground of the downwardly extending member. I have obtained very accurate adjustment of the relative lengths of the downwardly extending members with respect to the upwardly extending members by the mechanism shown in detail in Fig. 4. This adjusting assembly is desirable and often helpful but is not essential to the successful operation of my invention. It is to be understood that the same assembly is associated with each of the downwardly extending members 11' and 12 and is identical and therefore I have shown but one for the purpose of illustration and description.

The downwardly extending member 11' is, in Fig. 4, made up of telescoping members whereof the outer is designated as 11a and the inner is designated as 11b, the outer member 11a having fixed to it a toothed rack 16 with which is meshed a pinion 17 carried on a shaft 18 to which is keyed a spur gear 19 and that is suitably mounted in a supporting hanger 20 secured to a portion of the arm 9. Shaft 21 is rotatably supported in brackets 22 extending from arm 9 and carries at one end a hand wheel 23 and at its other end a spur gear 24 meshed with spur gear 19. It is obvious that manipulation of hand wheel 23 will result in moving the member 11a longitudinally on member 11b to change the effective length of the collector member as a whole and thereby make possible an extremely accurate adjustment of the length thereof so it shall be of the same electrical length as the member 11.

The operation of my invention is as follows:

The receiver is conditioned for operation and the housing 5 together with arms 9 and 10 is rotated in azimuth until the desired signal is received with a minimum value, then the arms 9 and 10 are rotated equally about their common horizontal axis until the minimum signal is very sharp and is usually zero. The tips of the collector members 11, 12, etc. are then pointing away from the direction in which the received electromagnetic wave is approaching the antenna. When the collectors are in a position giving the sharpest possible minimum, then the collector members are lying in a plane which is parallel to the wave front of the received waves. To eliminate any uncertainty as to the direction of the signal, the collectors 11, etc., are maintained in the vertical angle at which the sharpest minimum signal was determined and the entire collector system is rotated 180° in azimuth, where it will be found that the lowest signal value obtainable is very broad, and in fact it frequently occurs that no evidence of a minimum is indicated, particularly when receiving from an aircraft which would give a high angle wave. It is then known that the direction of the signal source is the azimuth setting where the best minimum is obtained.

The foregoing method of operation, which forms a part of the invention, is illustrated in Figs. 5 to 12 and contrasted with the usual method of operation of an Adcock direction finder not constructed for the rotation of the collectors in vertical planes.

Consider a vertically polarized wave, approaching from the left as shown in Fig. 11. The front of the wave makes an angle $\theta$ with respect to the surface of the earth, which is known as the wave front angle. This angle is seldom 90° in the higher frequency waves due to reflection of the wave from the Kenneily-Heaviside layer.

In Fig. 5 is shown an Adcock direction finder with its collectors extending vertically. In such a position the direction finder would have, for a wave such as that illustrated in Fig. 11 a polar response curve such as that illustrated in Fig. 8. This is a figure-of-eight or cosine curve with minima 180° apart. It should be noted that these minima are not perfect but that they are practically identical so that they afford no means of distinction between the actual bearing of the wave source and its reciprocal.

Fig. 9 shows one-half of a polar response pattern obtained with the antenna rotated as shown in Fig. 6 to make an angle with the horizontal which is equal to the angle $\theta$. It will be noted that a well defined minimum is obtained.

In Fig. 7 the direction finder has been rotated 180° in azimuth with the vertical setting of the antennas unchanged. The remainder of the polar response pattern for this vertical setting is shown in Fig. 10. It will be seen that the minimum obtained is much broader and shallower than that shown in Fig. 9 and is easily distinguishable therefrom. This is readily apparent from the complete response pattern shown in Fig. 12.

It has been repeatedly observed when homing aircraft that as the plane approaches within approximately one-half mile of the direction finder, it is necessary to decrease the vertical angle of the collectors to maintain the bearing or even to pick up signal, which gives this device considerable value as an indicator of the close approach of an aircraft to the homing site. If the aircraft flies overhead, it is of course necessary that the collectors be rotated to a horizontal portion to maintain reception of signals, which indicates that the craft is ready to effect a landing.

It will be apparent that since the present invention makes it possible to determine the vertical angle of the path of a signal, if the data as to the altitude of an aircraft are received from the pilot it is readily possible to determine the distance of the craft from the apparatus.

I am aware that others have heretofore suggested the use of collectors mounted to be rotatable in azimuth, as in the patent to Leib et al., 2,120,366, but so far as I am informed no one has heretofore taught the necessary step of ascertaining not only the azimuth angle, but the elevational angle as well, when using radio signals to determine direction.

For the purpose of defining terms used in the claims, the expression "sharpest null response" or its equivalent, means that the change in response per degree of rotation about the vertical axis of rotation of the antenna system in the vicinity of the null is greatest. Thus as seen in Figure 12 it is clear that the response curve is steeper in the vicinity of the minimum or null occurring at zero degrees than it is in the vicinity of the null or minimum occurring at 180 degrees. The null at zero degrees is therefore sharper than the null or minimum seen at 180 degrees. Also the null is sharper at zero degrees in Figure 12 than the nulls shown in the Figure 8.

By the term "polarization plane" of the antenna is meant the common plane in which the collector elements 11—12, 11'—12' are situated.

The invention herein described and claimed may be used and/or manufactured by or for the Government of the United States of America for governmental purposes without the payment of any royalties thereon or therefor.

I claim:

1. A radio direction finder, comprising two collectors each having an upwardly and a downwardly extending member spaced from each other, all said members being coplanar with the upwardly extending member of one collector lying in substantially the same straight line as the downwardly extending member of the other collector, the portions of said collectors extending between said upwardly and downwardly extending members lying parallel to each other in a plane at right angles to the plane of said members, means for supporting said collectors to rotate said upwardly and downwardly extending members in vertical planes, a housing wherein said means are rotatably supported, said housing containing a radio receiver and the power supply therefor, and means for supporting said housing at a distance above the ground and to be rotatable in azimuth.

2. A radio direction finder, comprising two collectors each having an upwardly and a downwardly extending member, all said members being coplanar with the upwardly extending member of one collector lying in substantially the same straight line as the downwardly extending member of the other collector, the portions of said collectors extending between said upwardly and downwardly extending members lying parallel to each other in a plane at right angles to the plane of said members, each said downwardly extending member consisting of relatively adjustable portions to change the length thereof, means for relatively moving the portions of said downwardly extending members including a rack on one portion, a pinion meshed with said rack, and means to rotate said pinion, and means supporting said collectors spaced from the ground for rotation about both horizontal and vertical axes.

3. A radio direction finder, comprising two collectors each having an upwardly and a downwardly extending member, all said members being coplanar with the upwardly extending member of one collector lying in substantially the same straight line as the downwardly extending member of the other collector, the portions of said collectors extending between said upwardly and downwardly extending members lying parallel to each other in a plane at right angles to the plane of said members, each said downwardly extending member consisting of relatively adjustable portions to change the length thereof, means for relatively moving the portions of said downwardly extending members including a rack on one portion, a pinion meshed with said rack, and means to rotate said pinion.

4. A radio direction finder, comprising a housing, a radio receiver and power supply therein, coaxial hollow arms extending horizontally to the sides of said housing, said arms being mounted in said housing for simultaneous and equal rotation about the common axis, a pair of Adcock collectors each having a member extending upwardly from an end of one of said arms and a member extending downwardly from the end of the other said arm, all said members lying in a common plane and the members at the end of the same arm lying in substantially the same straight line, the connecting portions between the collector members being twisted in a manner such that the plane of the connecting portions is positioned at right angles to the common plane of the collector members, and an insulating support on which said housing is mounted for rotation in azimuth.

5. A method of radio direction finding, comprising the steps of determining the azimuth and elevation angles at which a signal minimum is obtained, and then determining the signal strength at the same elevational angle at 180° of azimuth from the direction of the first determination.

6. A method of radio direction finding, comprising the steps of determining the azimuth angle at which a minimum signal is obtained, maintaining said azimuth angle and determining the angle of elevation at which the signal is further reduced to a new lower minimum, and then maintaining said elevational angle and determining the signal strength at 180° of azimuth from the direction of the first determination.

7. A method of utilizing an antenna array having 180° ambiguity for radio direction finding, comprising the steps of determining the azimuth angle at which a minimum signal is obtained and maintaining said azimuth angle while determining the angle of elevation at which said minimum signal is reduced to its lowest value.

8. A radio direction finder, comprising two collectors each having an upwardly and a downwardly extending member spaced from each other, all said members being coplanar with the upwardly extending member of one collector lying in substantially the same straight line as the downwardly extending member of the other collector, the portions of said collectors extending between said upwardly and downwardly extending members lying parallel to each other in a plane at right angles to the plane of said members, means for supporting said collectors to rotate said upwardly and downwardly extending members in vertical planes, means coupled to said collectors for rotating same about a vertical axis.

9. In a direction finding system a method of utilizing a plane polarized antenna rotatable about a given axis of rotation, and having 180° directional ambiguity in its response pattern, for determining the direction of approach of an electromagnetic wave having a linear electric field vector which makes an angle with said axis of rotation which comprises the steps of adjusting the antenna so that the polarization plane thereof makes an angle relative to said axis of rotation, rotating the antenna about said given axis of rotation until it is in a position giving the sharpest null response.

10. In a direction finding system, a method of utilizing an antenna rotatable about a given axis of rotation and including a series of parallel, oblong, conducting elements properly spaced and interconnected so as to give a directional response pattern having an 180° ambiguity for determining the direction of approach of an electromagnetic wave having a linear electric field vector which makes an angle with said axis of rotation which comprises the steps of adjusting said antenna so that the long dimension of said antenna conducting elements make an angle with respect to said axis of rotation, rotating said antenna until it is in a position giving the sharpest null response.

11. A method of determining the direction from which an electromagnetic wave is approaching a bi-directional antenna having a symmetrical response pattern when it is rotated about an axis coinciding with the plane of polarization thereof comprising the step of rotating said antenna about an axis which makes an angle both with the wave front of the electromagnetic wave and with the polarization plane of the antenna into a position giving the sharpest null response, determining the azimuth angle of a line normal to the polarization plane of the antenna.

12. A method of determining the direction from which an electromagnetic wave is approaching a bi-directional antenna located at the surface of the earth having a symmetrical response pattern when it is rotated about an axis coinciding with the plane of polarization thereof comprising the step of rotating said antenna about an axis which makes an angle both with the wave front of the electromagnetic wave and with the polarization plane of the antenna into a position giving the sharpest null response, determining the azimuth angle of a line normal to the polarization plane of the antenna which extends upward from said plane.

RAYMOND A. GORDON.

REFERENCES CITED

The following references are of record in the file of this patent:

UNITED STATES PATENTS

| Number | Name | Date |
|---|---|---|
| 1,718,431 | Pickard | June 25, 1929 |
| 1,911,234 | Meyer | May 30, 1933 |
| 2,120,366 | Leib et al. | June 14, 1938 |
| 2,266,918 | Sullinger et al. | Dec. 23, 1941 |
| 2,269,437 | Clemener | Jan. 13, 1942 |